(12) United States Patent
Ji

(10) Patent No.: US 12,591,513 B2
(45) Date of Patent: Mar. 31, 2026

(54) MEMORY CONTROLLER PERFORMING REFRESH OPERATION AND MEMORY SYSTEM INCLUDING THE SAME

(71) Applicant: SK hynix Inc., Icheon-si (KR)

(72) Inventor: You Min Ji, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/608,792

(22) Filed: Mar. 18, 2024

(65) Prior Publication Data

US 2025/0094334 A1 Mar. 20, 2025

(30) Foreign Application Priority Data

Sep. 19, 2023 (KR) ......................... 10-2023-0124553

(51) Int. Cl.
G06F 12/02 (2006.01)

(52) U.S. Cl.
CPC ................................. G06F 12/0246 (2013.01)

(58) Field of Classification Search
CPC ... G06F 12/0246; G06F 3/0658; G11C 16/10; G11C 16/08; G11C 16/26
See application file for complete search history.

(56) References Cited

U.S. PATENT DOCUMENTS

| | | | | |
|---|---|---|---|---|
| 10,185,657 | B2 | 1/2019 | Zhang et al. | |
| 2013/0055046 | A1* | 2/2013 | Blodgett ............. | G06F 11/0793 |
| | | | | 714/764 |

| | | | | |
|---|---|---|---|---|
| 2015/0006792 | A1* | 1/2015 | Lee ........................ | G06F 3/0616 |
| | | | | 711/162 |
| 2015/0242143 | A1* | 8/2015 | Kim ...................... | G06F 3/0679 |
| | | | | 714/704 |
| 2015/0268871 | A1* | 9/2015 | Shu ...................... | G06F 12/0246 |
| | | | | 711/103 |
| 2016/0179613 | A1* | 6/2016 | Suto .................... | G06F 11/1048 |
| | | | | 714/773 |
| 2020/0110660 | A1* | 4/2020 | Cariello .............. | G06F 11/1048 |
| 2022/0148664 | A1* | 5/2022 | Cho ..................... | G11C 11/5671 |
| 2022/0188223 | A1* | 6/2022 | Schuh .................. | G06F 3/0679 |
| 2023/0069656 | A1* | 3/2023 | Lee .................... | G11C 11/40622 |
| 2024/0069768 | A1* | 2/2024 | Redaelli ............. | G11C 16/3418 |
| 2024/0103732 | A1* | 3/2024 | Chen ..................... | G06F 3/0646 |
| 2024/0103759 | A1* | 3/2024 | Chen ....................... | G06F 3/064 |
| 2024/0134538 | A1* | 4/2024 | Chou ...................... | G06F 3/064 |

(Continued)

FOREIGN PATENT DOCUMENTS

KR 20220105303 A 7/2022

*Primary Examiner* — Tasnima Matin
(74) *Attorney, Agent, or Firm* — Perkins Coie LLP

(57) ABSTRACT

A memory system is provided to include a memory device including a first memory block and a second memory block, and a memory controller configured, in response to a read request from a host, to control the memory device to read data stored in a first page corresponding to a first logical address included in the read request, update a read count of the first memory block including the first page, and perform a refresh operation of copying data stored in pages of the first memory block to the second memory block based on the read count of the first memory block. The memory controller is further configured to control a priority of the refresh operation on any page based on the number of times logical addresses corresponding to the pages of the first memory block that are received from the host.

16 Claims, 12 Drawing Sheets

(56)          References Cited

U.S. PATENT DOCUMENTS

| 2024/0168638 A1* | 5/2024 | Kotikov | ................ G06F 3/0659 |
| 2024/0176517 A1* | 5/2024 | Lin | ........................ G06F 3/0634 |
| 2024/0311236 A1* | 9/2024 | Kanter | ................ G06F 11/1072 |

* cited by examiner

310

100

| Map Data | |
|---|---|
| LA | PA |
| LA1 | PADDR1 |
| LA2 | PADDR2 |
| LA3 | PADDR3 |
| ⋮ | ⋮ |
| LA9 | PADDR9 |
| LA10 | PADDR10 |

| BLK1 |
|---|
| Data1 |
| Data2 |
| Data3 |
| Data4 |
| ⋮ |
| Data9 |
| Data10 |

Page1
Page2
Page3
Page4
⋮
Page9
Page10

320

Read Count Info

| BLK | Read Cnt |
|---|---|
| BLK1 | 99 |
| BLK2 | 50 |
| BLK3 | 10 |
| BLK4 | 20 |
| ⋮ | ⋮ |

Read Page10

Read Count Info

| BLK | Read Cnt |
|---|---|
| BLK1 | 100 |
| BLK2 | 50 |
| BLK3 | 10 |
| BLK4 | 20 |
| ⋮ | ⋮ |

MEMORY CONTROLLER PERFORMING REFRESH OPERATION AND MEMORY SYSTEM INCLUDING THE SAME

PRIORITY CLAIM AND CROSS-REFERENCE TO RELATED APPLICATION

This patent document claims priority under 35 U.S.C. § 119(a) to This patent document claims priority to and benefits of the Korean patent application number 10-2023-0124553, filed on Sep. 19, 2023, which is incorporated herein by reference in its entirety.

TECHNICAL FIELD

The present disclosure relates to an electronic device, and more particularly, to a memory controller and a memory system including the same.

BACKGROUND

A memory system is a device that stores data under control of a host device such as a computer or a smartphone. The memory system may include a memory device in which data is stored and a memory controller controlling the memory device. The memory device is classified into a volatile memory device and a nonvolatile memory device.

The nonvolatile memory device is a device in which data is not lost even though power is cut off, and the nonvolatile memory device includes a read only memory (ROM), a programmable ROM (PROM), an electrically programmable ROM (EPROM), an electrically erasable and programmable ROM (EEPROM), a flash memory, and the like.

The nonvolatile memory device may store data in a plurality of memory blocks. The number of error bits of data stored in any one memory block may increase according to the number of times data is read. When the number of error bits included in the data increases, reliability of the data may be reduced. In order to increase reliability of data, a nonvolatile memory device may perform a refresh operation of copying data stored in any one memory block to another memory block.

SUMMARY

Various embodiments of the present disclosure provide a memory controller and a memory system including the same, which are capable of providing data requested from a host in a predetermined time.

In one aspect, a memory system is provided to include a memory device including a first memory block and a second memory block, and a memory controller in communication with the memory device and configured, in response to a read request from a host, to control the memory device to read data stored in a first page corresponding to a first logical address included in the read request, update a read count of the first memory block including the first page, and perform a refresh operation of copying data stored in pages of the first memory block to the second memory block based on the read count of the first memory block. The memory controller is further configured to control a priority of the refresh operation on any page among the pages of the first memory block, based on the number of times logical addresses corresponding to the pages of the first memory block that are received from the host.

In another aspect, a memory controller for controlling operations of a memory device is provided to include a host interface configured to receive a read request including a logical address from a host, a metadata manager configured to update a read count of a first memory block including a first page corresponding to the logical address, and an operation controller in communication with the memory device including a first memory block of pages of memory cells and a second memory block of pages of memory cells and configured to control a memory device including a first memory block and a second memory block to perform a refresh operation of copying data stored in pages of the first memory block to the second memory block based on a read count of the first memory block. The operation controller is further configured to control a priority of the refresh operation on one or more pages among the pages of the first memory block based on the read count of the first memory block, the read count increasing based on the number of times of receiving read requests after the refresh operation is started.

In another aspect, a memory system is provided to include a memory device including a first memory block and a second memory block, and a memory controller in communication with a host and the memory device and configured, in response to a read request from the host, to control the memory device to read data stored in a first page corresponding to a logical address included in the read request, update a read count of the first memory block including the first page, and perform a refresh operation of copying data stored in pages of the first memory block to the second memory block based on the read count of the first memory block. The memory controller is further configured to control a priority of the refresh operation on the first page corresponding to the logical address among the pages of the first memory block in response to the read request that is received from the host and after entering a host read blocking state delaying performance of a read operation corresponding to the read request based on the read count of the first memory block, the read count increasing after the refresh operation is started.

According to the present technology, a memory controller and a memory system including the same capable of providing data requested from a host in a predetermined time.

BRIEF DESCRIPTION OF THE DRAWINGS

FIG. 6 is a diagram illustrating a sequence in which the refresh operation is performed based on some implementations of the disclosed technology.

FIG. 7 is a diagram illustrating the refresh operation performed based on the read count of the memory block increasing according to a repeatedly received read request based on some implementations of the disclosed technology.

DETAILED DESCRIPTION

Specific structural or functional descriptions of embodiments of the disclosed technology are illustrated for the examples only. Various embodiments may be carried out in various forms and should not be construed as being limited to the embodiments described in this patent document.

Figure 1:
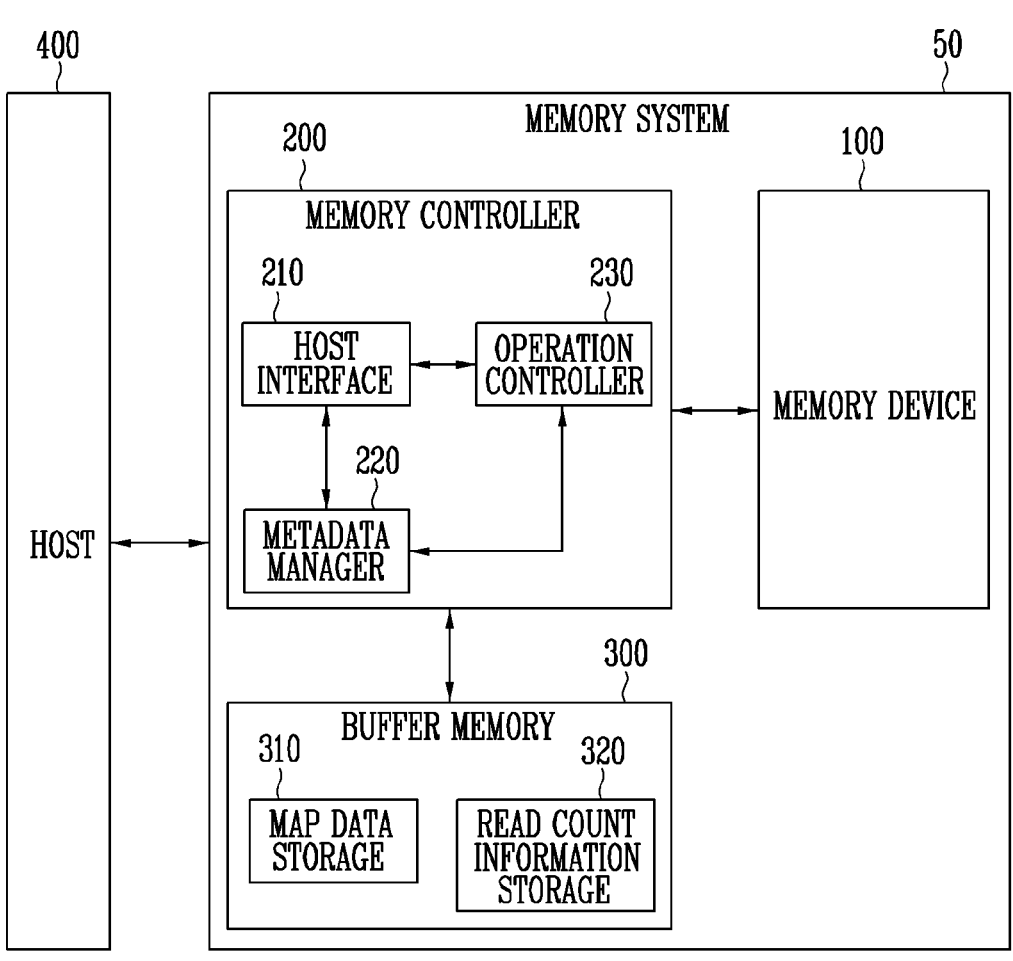
FIG. 1 is a diagram illustrating a memory system including a memory controller and a memory device based on some implementations of the disclosed technology.

FIG. 1 is a diagram illustrating a memory system including a memory controller and a memory device based on some implementations of the disclosed technology.

Referring to FIG. 1, the memory system 50 may include the memory device 100, the memory controller 200, and a buffer memory 300. The memory system 50 may be included in a mobile phone, a computer, a vehicle infotainment, or the like. The memory system 50 may be a device that stores data under control of a host 400, which is an external device.

The memory system 50 may be manufactured as various types of storage devices such as a solid state drive (SSD) and a universal flash storage (UFS) according to a communication method with the host 400. The memory system 50 may be manufactured as various types of package types such as a system on chip (SOC).

The memory device 100 may store data. The memory device 100 may operate in response to control of the memory controller 200. In an embodiment, the memory device 100 may be a nonvolatile memory device.

The memory device 100 may receive a command and an address from the memory controller 200 and may perform an operation instructed by the command with respect to an area selected by the address. The memory device 100 may perform a program operation (write operation) of storing data in an area selected by the address, a read operation of reading data, or an erase operation of deleting data.

The memory controller 200 may control an overall operation of the memory system 50.

When power is applied to the memory system 50, the memory controller 200 may execute firmware (FW). In an embodiment, the memory controller 200 may execute firmware to control communication between the host 400 and the memory device 100. In an embodiment, the memory controller 200 may convert a logical address of the host into a physical address of the memory device.

The memory controller 200 may control the memory device 100 to perform the program operation, the read operation, the erase operation, or the like according to a request of the host 400. The memory controller 200 may provide a command, a physical address, or data to the memory device 100 according to the write operation, the read operation, or the erase operation.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the read operation and the program operation accompanying in performing wear leveling, read reclaim, garbage collection, or the like, to the memory device 100.

The buffer memory 300 may temporarily store data provided from the host 400 or may temporarily store data read from the memory device 100. In an embodiment, the buffer memory 300 may be a volatile memory device. For example, the buffer memory 300 may be a dynamic random access memory (DRAM) or a static random access memory (SRAM). In an embodiment, the buffer memory 300 may be positioned outside the memory controller 200 or may be positioned inside the memory controller 200.

In an embodiment, the buffer memory 300 may store metadata. The metadata may be data including information used to operate the memory system 50.

In an embodiment, the buffer memory 300 may include a map data storage 310 and a read count information storage 320. The map data storage 310 may store map data indicating a correspondence relationship between a logical address of the host and a physical address of the memory device. The physical address may be an address indicating a position where data is stored in the memory device 100. The physical address may be a block address indicating an address of a memory block included in the memory device 100. The physical address may be a page address indicating an address of a page included in the memory block.

The read count information storage 320 may store read count information on each of a plurality of memory blocks included in the memory device. The read count information may be information indicating the number of times a read operation is performed on each of the plurality of memory blocks.

In an embodiment, the memory controller 200 may include a host interface 210, a metadata manager 220, and an operation controller 230.

The host interface 210 may receive a request including the logical address from the host 400. The request received from the host 400 may be a program request or a read request. The host interface 210 may provide the logical address received from the host 400 to the metadata manager 220.

The metadata manager 220 may manage metadata used in an operation of the memory system 50. In an embodiment, the metadata manager 220 may identify the physical address corresponding to the logical address received from the host 400 using the map data. The metadata manager 220 may provide the physical address corresponding to the logical address to the operation controller 230.

In an embodiment, the metadata manager 220 may update the read count information on each of the plurality of memory blocks included in the memory device. In an embodiment, the metadata manager 220 may increase a read count of a memory block including a page having a physical address corresponding to a logical address included in the read request.

In an embodiment, the operation controller 230 may control an operation of the memory device 100. The operation controller 230 may generate a read command in response to the read request received from the host. The operation controller 230 may provide the read command and the physical address to the memory device 100.

In an embodiment, the operation controller 230 may control a refresh operation on the memory device 100. The refresh operation may be an operation of copying data stored in any one memory block among the plurality of memory blocks to another memory block. In an embodiment, the refresh operation may be garbage collection or read reclaim.

In an embodiment, the operation controller 230 may control the memory device 100 to perform the refresh operation based on the read count information. The operation controller 230 may control the memory device 100 to perform a refresh operation of copying data stored in a memory block having a read count value greater than a threshold count among the plurality of memory blocks to another memory block.

The host 400 may communicate with the memory system 50 using various communication methods.

Figure 2:
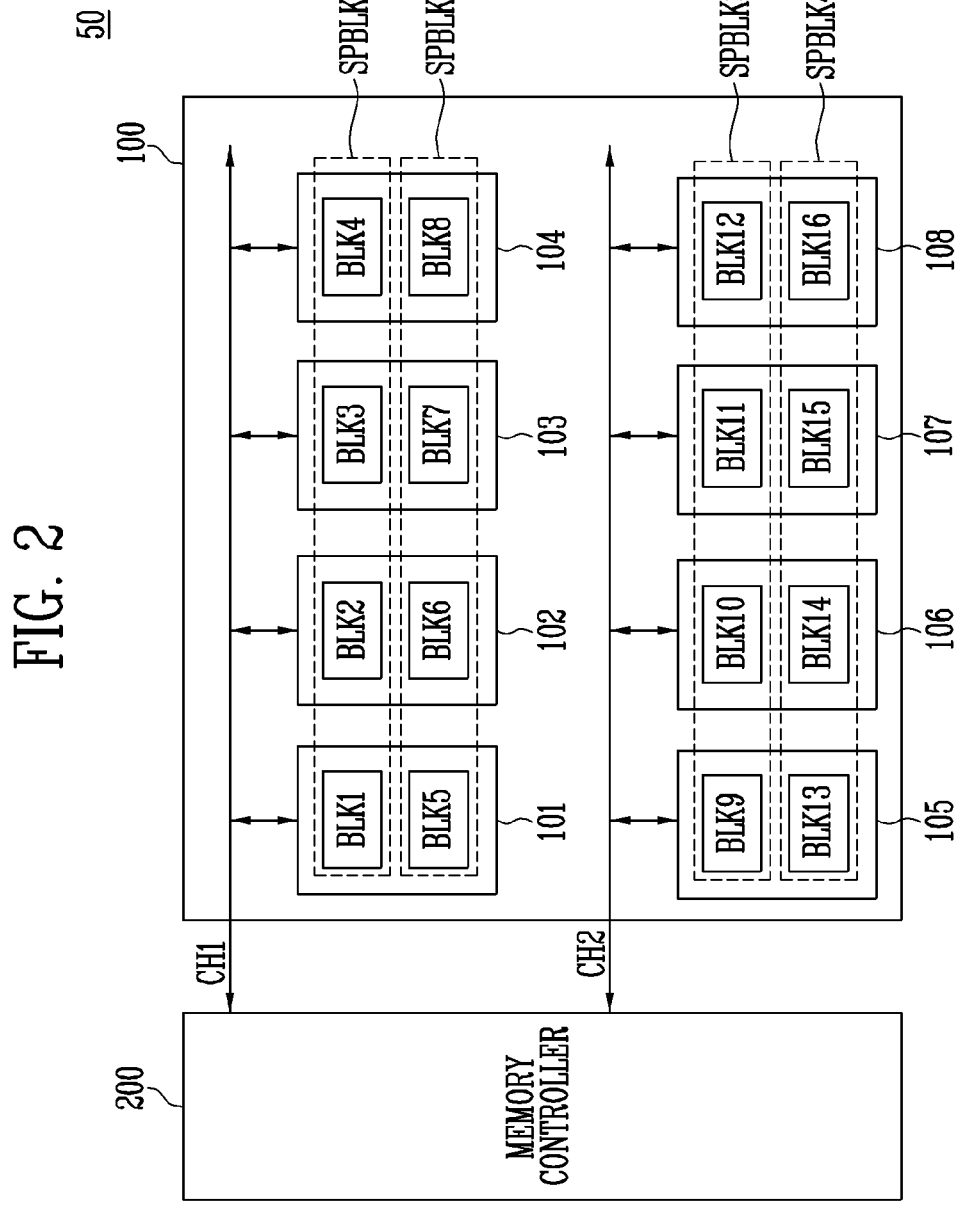
FIG. 2 is a diagram illustrating super blocks including a plurality of memory blocks based on some implementations of the disclosed technology.

FIG. 2 is a diagram illustrating super blocks including the plurality of memory blocks based on some implementations of the disclosed technology.

Referring to FIG. 2, the memory device 100 shown in FIG. 1 may include a plurality of memory dies 101 to 108. The plurality of memory dies 101 to 108 may include a plurality of memory blocks BLK1 to BLK16. In FIG. 2, for convenience of description, each of the plurality of memory dies 101 to 108 includes two memory blocks as an example. The memory controller 200 may be connected to the plurality of memory dies 101 to 108 through first and second channels CH1 to CH2. The number of channels or the number of memory dies connected to each channel can be modified in various manners without being limited to that shown in FIG. 2.

The first to fourth memory dies 101 to 104 may be commonly connected to the first channel CH1. The first to fourth memory dies 101 to 104 may communicate with the memory controller 200 through the first channel CH1. The fifth to eighth memory dies 105 to 108 may be commonly connected to the second channel CH2. The fifth to eighth memory dies 105 to 108 may communicate with the memory controller 200 through the second channel CH2.

In one implementation, the memory system 50 including a plurality of memory dies may perform an operation using an interleaving method. The interleaving method may perform an operation of reading or storing data from each of the plurality of memory dies in a structure in which a plurality of memory dies share one channel. In an embodiment, the memory controller 200 may distribute and allocate data corresponding to consecutive logical addresses to each of the plurality of memory dies.

In an embodiment, the memory controller 200 may transmit a command, an address, or data to the first memory die 101 through the first channel CH1. The memory controller 200 may transmit a command, an address, or data to the second memory die 102 while the first memory die 101 performs an operation in response to the command.

In an embodiment, the memory controller 200 may configure super blocks. Each of the super blocks may include at least one memory blocks included in different memory dies. In an embodiment, the memory controller 200 may config-ure at least one or more memory blocks included in each of the first to fourth memory dies 101 to 104 into a first super block SPBLK1 and a second super block SPBLK2. In an embodiment, the first super block SPBLK1 may include the first memory block BLK1 included in the first memory die 101, the second memory block BLK2 included in the second memory die 102, the third memory block BLK3 included in the third memory die 103, and the fourth memory block BLK4 included in the fourth memory die 104.

In another embodiment, the memory controller 200 may configure at least one or more memory blocks included in each of the fifth to eighth memory dies 105 to 108 into a third super block SPBLK3 and a fourth super block SPBLK4. In an embodiment, the third super block SPBLK3 may include the ninth memory block BLK9 included in the fifth memory die 105, the tenth memory block BLK10 included in the sixth memory die 106, the eleventh memory block BLK11 included in the seventh memory die 107, and the twelfth memory block BLK12 included in the eighth memory die 108.

Figures 3, 4:
FIG. 3 is a diagram illustrating a read operation using map data based on some implementations of the disclosed technology.
FIG. 4 is a diagram illustrating an operation of updating a read count of a memory block based on some implementations of the disclosed technology.

FIG. 3 is a diagram illustrating the read operation using the map data based on some implementations of the disclosed technology.

In FIG. 3, map data related to a first memory block among the plurality of memory blocks is described as an example. Referring to FIG. 3, the map data storage 310 may store the map data related to the first memory block BLK1. First to tenth logical addresses LA1 to LA10 may correspond to first to tenth page addresses PADDR1 to PADDR10, respec-tively. The first to tenth page addresses PADDR1 to PADDR10 may be addresses of first to tenth pages Page1 to Page10 included in the first memory block BLK1.

In an embodiment, the host interface 210 of FIG. 1 may receive the logical address included in the read request from the host 400. The host interface 210 may provide the logical address to the metadata manager 220.

Thereafter, the metadata manager 220 may read the map data stored in the map data storage 310. The metadata manager 220 may identify a physical address corresponding to the logical address received from the host 400 using the map data. For example, when the metadata manager 220 receives the tenth logical address LA10 from the host 400, the metadata manager 220 may identify that a physical address corresponding to the tenth logical address LA10 is the tenth page address PADDR10. The tenth page address PADDR10 may be an address of the tenth page Page10.

The metadata manager 220 may provide the tenth page address PADDR10 to the operation controller 230. The operation controller 230 may generate a read command and provide the read command and the tenth page address PADDR10 to the memory device 100. The memory device 100 may select the tenth page Page10 among the first to tenth pages Page1 to Page10 included in the first memory block BLK1 based on the tenth page address PADDR10, and read tenth data Data10 stored in the tenth page Page10. The memory device 100 may provide the tenth data Data10 read from the tenth page Page10 to the operation controller 230. The operation controller 230 may provide the tenth data Data10 to the host 400 through the host interface 210.

FIG. 4 is a diagram illustrating an operation of updating a read count of a memory block based on some implemen-tations of the disclosed technology.

FIG. 4 is described with reference to FIGS. 1 and 3. Referring to FIG. 4, the read count information storage 320 may store read count information (Read Count Info) indi-cating the number of times a read operation on each of the plurality of memory blocks is performed. The read count information (Read Count Info) may be updated after data stored in the plurality of pages included in each of the plurality of memory blocks is read.

In an embodiment, the metadata manager 220 of FIG. 1 may read the read count information (Read Count Info) from the read count information storage 320 after the tenth data (Data10) stored in the tenth page Page10 is read. The metadata manager 220 may identify a read count (Read Cnt) of the first memory block including the tenth page (Page10) based on the read count information. The metadata manager 220 may increase the read count of the first memory block after the read operation on the tenth page Page10 is performed. For example, when the tenth data (Data10) is read from the tenth page (Page10), the metadata manager 220 may increase the read count of the first memory block from 99 to 100. Thereafter, the metadata manager 220 may store read count information (Read Count Info) in which the read count of the first memory block is updated in the read count information storage 320.

In an embodiment, the metadata manager 220 may increase the read count of the first memory block based on the number of times the first to tenth data (Data1 to Data10) stored in the first to tenth pages (Page1 to Page10) included in the first memory block BLK1 are read. In an embodiment, the metadata manager 220 may increase the read count of the first memory block based on the number of times the first to tenth logical addresses (LA1 to LA10) corresponding to the first to tenth page addresses (PADDR1 to PADDR10), which are addresses of the first to tenth pages (Page1 to Page10), are received from the host 400.

Figure 5:
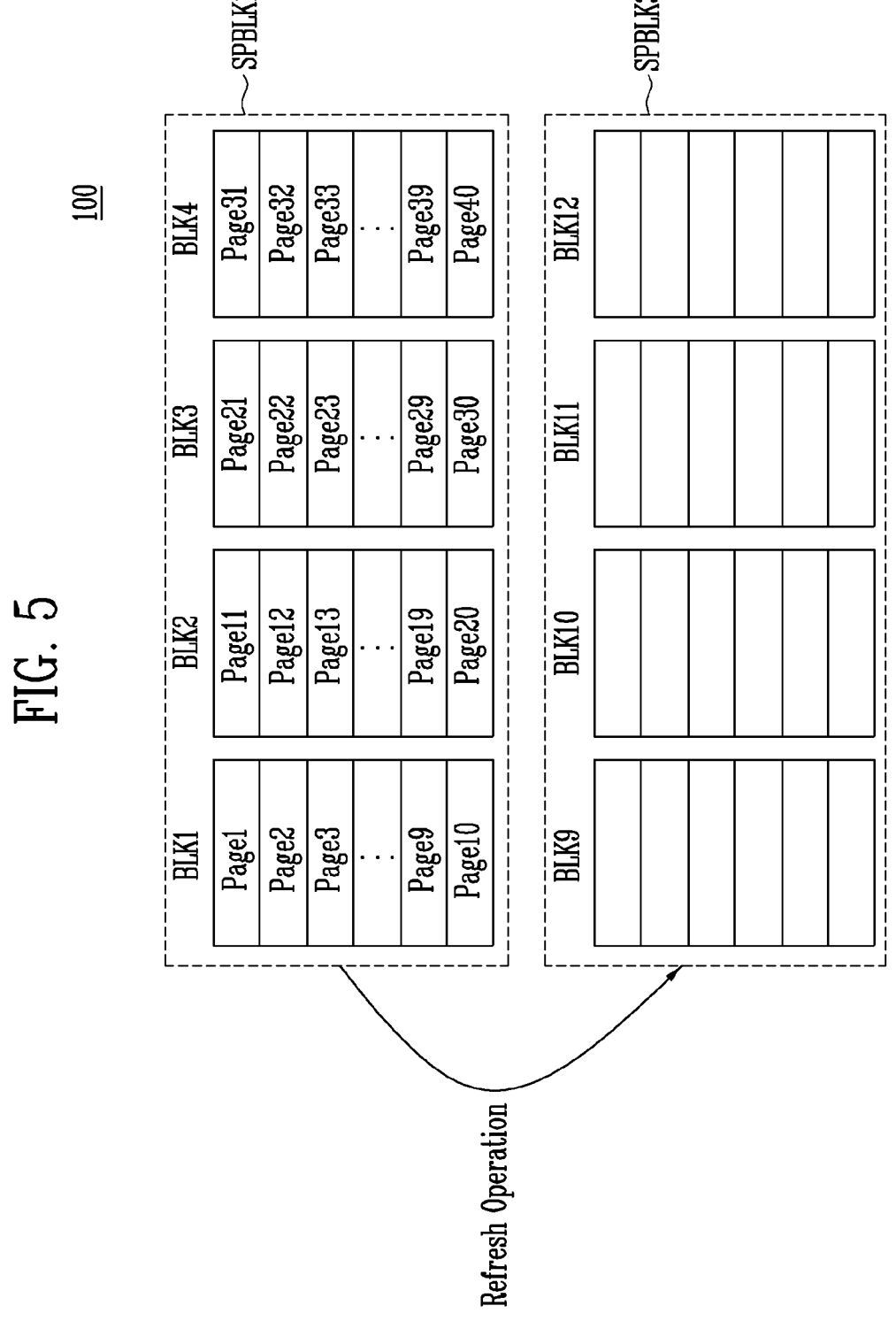
FIG. 5 is a diagram illustrating a refresh operation of copying data stored in any one super block to another super block based on some implementations of the disclosed technology.

FIG. 5 is a diagram illustrating a refresh operation of copying data stored in any one super block to another super block based on some implementations of the disclosed technology.

Referring to FIG. 5, the first super block (SPBLK1) of FIG. 2 may include first to fourth memory blocks included in different memory dies. The third super block (SPBLK3) may include ninth to twelfth memory blocks included in different memory dies. The ninth to twelfth memory blocks may be free blocks in which data is not stored.

In an embodiment, the operation controller 230 of FIG. 1 may control the memory device 100 to perform the refresh operation based on the read count information. When the read count of any one memory block among the plurality of memory blocks is greater than the threshold count, the operation controller 230 may control the memory device 100 to perform the refresh operation of copying data stored in a super block including any one memory block to another super block.

In an embodiment, the operation controller 230 may read the read count information from the read count information storage 320 and identify read counts of the first to fourth memory blocks (BLK1 to BLK4). In an embodiment, the operation controller 230 may control the memory device 100 to perform a refresh operation on the first super block (SPBLK1) including the first memory block (BLK1) when the read count of the first memory block (BLK1) is greater than the threshold count. After performing the refresh operation, data stored in first to fortieth pages (Page1 to Page40) included in the first to fourth memory blocks (BLK1 to BLK4) may be stored in the ninth to twelfth memory blocks (BLK9 to BLK12) included in the third super block (SPBLK3) through the refresh operation.

Figure 6:
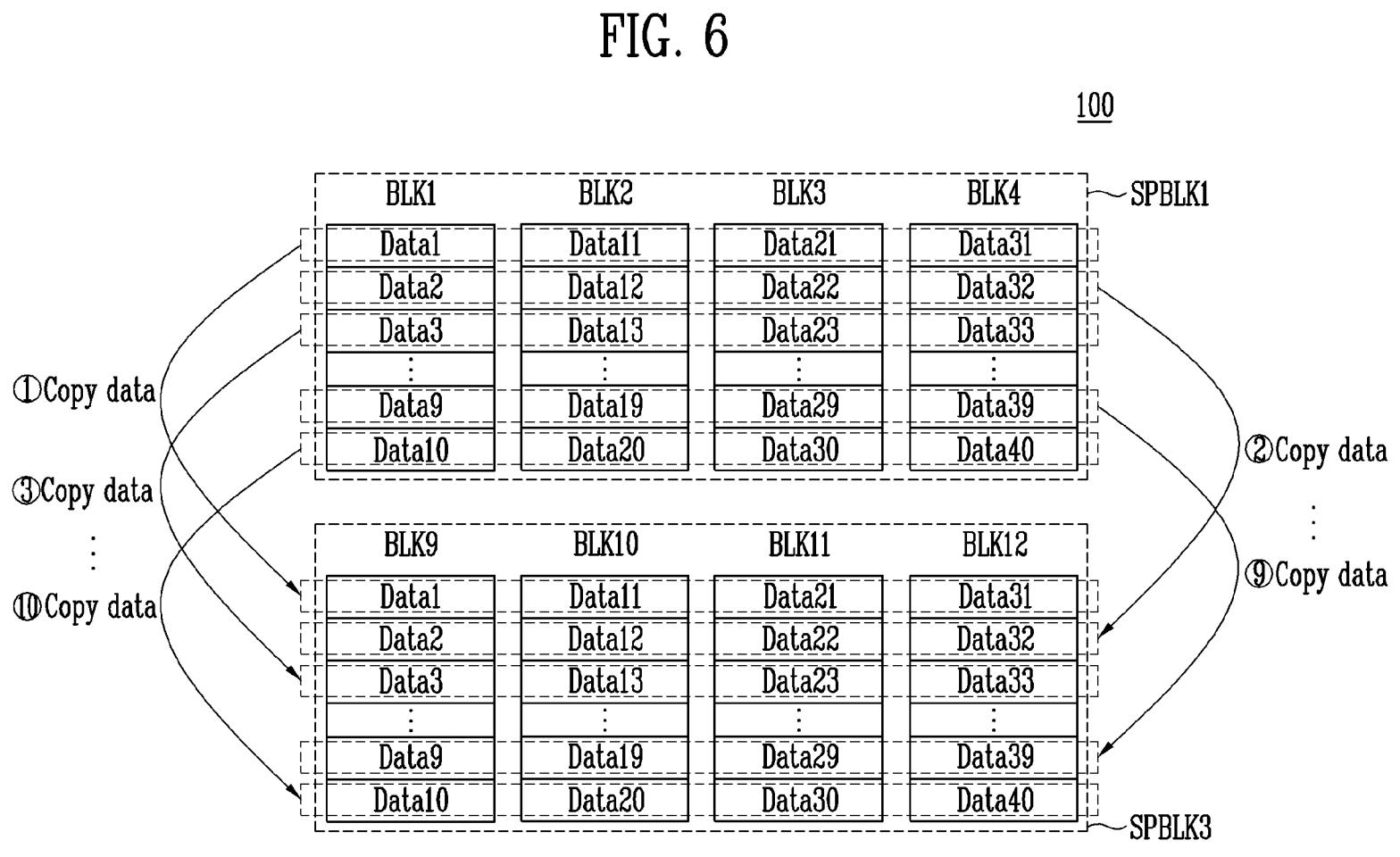

FIG. 6 is a diagram illustrating a sequence in which the refresh operation is performed based on some implementations of the disclosed technology.

Referring to FIGS. 5 and 6, before the refresh operation, first to fortieth data (Data1 to Data40) may be stored in the first super block (SPBLK1). The first to fortieth data (Data1 to Data40) may be stored in the first to fortieth pages (Page1 to Page40), respectively.

In an embodiment, the operation controller 230 of FIG. 1 may control the memory device 100 to sequentially copy the first to fortieth data (Data1 to Data40) stored in the first super block (SPBLK1) to the third super block (SPBLK3) during the refresh operation.

In an embodiment, the operation controller 230 may control the memory device 100 to sequentially copy data according to a sequence of page addresses corresponding to pages included in each memory block.

The operation controller 230 may control the memory device 100 to sequentially copy data from pages having first page addresses in the respective first to fourth memory blocks BLK1 to BLK4 to pages having last page addresses in the respective first to fourth memory blocks (BLK1 to BLK4). The data copied from the first to fourth memory blocks (BLK1 to BLK4) is stored in the ninth to twelfth memory blocks (BLK9 to BLK12).

In the implementation as shown in FIG. 6, the pages having the first page address in the respective first to fourth memory blocks (BLK1 to BLK4) are the first page (Page1), the eleventh page (Page11), the twenty-first page (Page21), and the thirty-first page (Page31). For example, as described with reference to FIG. 3, the first to tenth pages (Page1 to Page10) included in the first memory block may respectively correspond to the first to tenth page addresses (PADDR1 to PADDR10). The first page (Page1) may have the smallest page address among the first to tenth pages (Page1 to Page 10) included in the first memory block (BLK1).

In an embodiment, the operation controller 230 may control the memory device during the refresh operation to copy the first data (Data1), the eleventh data (Data11), the twenty-first data (Data21), and the thirty-first data (Data31), which are respectively included in the first to fourth memory blocks (BLK1 to BLK4), to the ninth to twelfth memory blocks (BLK9 to BLK12) (see operation, ① Copy data, as shown in FIG. 6).

Thereafter, the operation controller 230 may control the memory device to copy the second data (Data2), the twelfth data (Data12), the twenty-second data (Data22), and the thirty-second data (Data32), which are stored in the second pages respectively included in the first to fourth memory blocks BLK1 to BLK4, to the ninth to twelfth memory blocks BLK9 to BLK12 (see operation, ② Copy data, as shown in FIG. 6).

Next, the operation controller 230 may control the memory device to sequentially copy data from third pages respectively included in the first to fourth memory blocks (BLK1 to BLK4) to ninth pages respectively included in the first to fourth memory blocks (BLK1 to BLK4), to the ninth to twelfth memory blocks BLK9 to BLK12.

Among the pages respectively included in the first to fourth memory blocks BLK1 to BLK4, the pages having the last page addresses, which include the tenth page (Page10), the twentieth page (Page20), the thirtieth page (Page30), and the fortieth (Page 40), may be copied last. The tenth data (Data10), the twentieth data (Data20), the thirtieth data (Data30), and the fortieth data (Data40), which are stored in the last pages respectively included in the first to fourth memory blocks BLK1 to BLK4, may be copied to the ninth to twelfth memory blocks BLK9 to BLK12 during the refresh operation (see operation, ⑩ Copy data, as shown in FIG. 6).

The refresh operation may end once the tenth data (Data10), the twentieth data (Data20), the thirtieth data (Data30), and the fortieth data (Data40), which is stored in the tenth page (Page10), the twentieth page (Page20), the thirtieth page (Page30), and the fortieth page (Page 40), are copied to the ninth to twelfth memory blocks BLK9 to BLK12.

Figure 7:
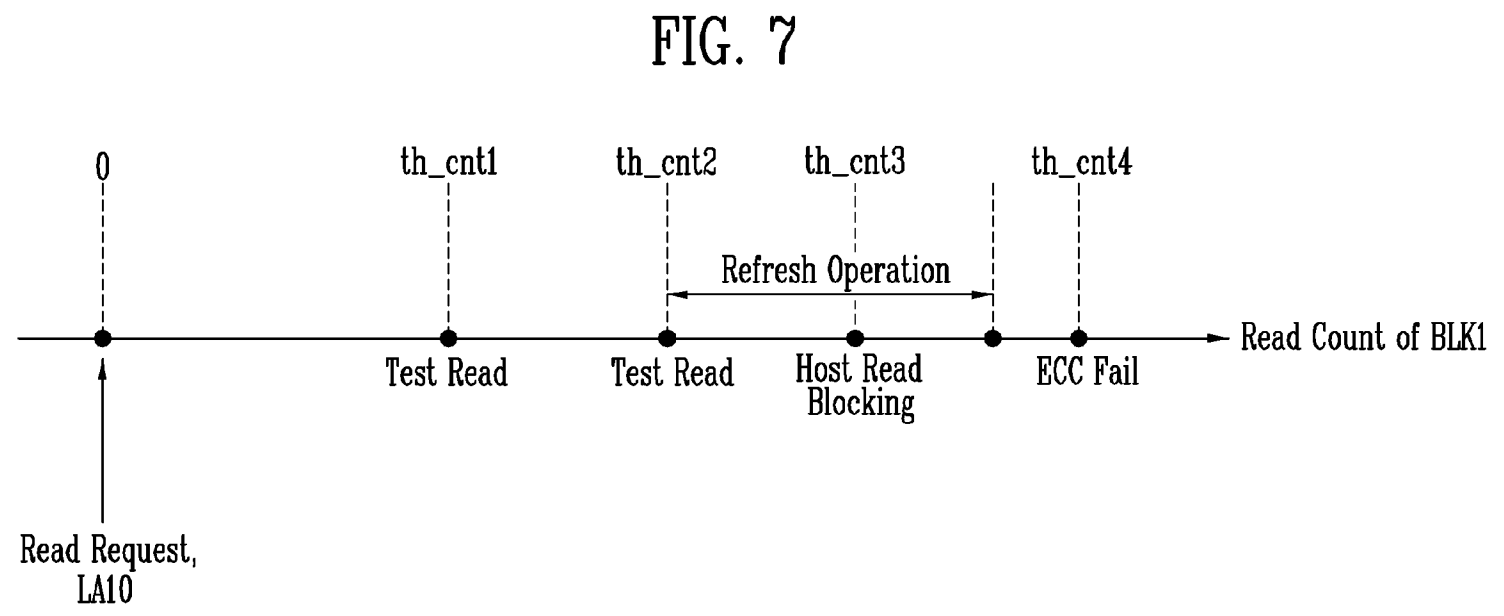

FIG. 7 is a diagram illustrating the refresh operation performed based on the read count of the memory block increasing according to a repeatedly received read request based on some implementations of the disclosed technology.

Referring to FIGS. 1, 6, and 7, the read count of the memory block may increase based on the number of times the read request including the logical address is received. With reference to FIG. 7, a case where the read request (Read Request) including a tenth logical address (LA10) is repeatedly received from the host 400 is described as an example.

In an embodiment, the host interface 210 may repeatedly receive the read request (Read Request) including the tenth logical address (LA10) from the host 400. The operation controller 230 may control the memory device 100 to read data stored in the tenth page Page10 having the tenth page address (PADDR10) corresponding to the tenth logical address LA10, and provide the read data to the host 400. The metadata manager 220 may increase the read count of the first memory block BLK1 including the tenth page (Page10).

In an embodiment, the read count of the first memory block (BLK1) may increase based on the number of times the read request including the tenth logical address (LA10) is received from the host 400. The read count of the first memory block (BLK1) may increase by the number of times the read request including the tenth logical address (LA10) is repeatedly received from the host 400.

In an embodiment, the read count of the first memory block BLK1 may reach a first threshold count (th_cnt1) as the read request including the tenth logical address LA10 is repeatedly received from the host 400. When the read count of the first memory block (BLK1) is equal to or greater than the first threshold count (th_cnt1), the operation controller 230 may control the memory device 100 to perform a test read operation of reading data stored in at least one page included in the first memory block BLK1.

During the test read operation, the operation controller 230 may count the number of error bits included in data read from a page included in the first memory block BLK1. The operation controller 230 may determine whether to perform the refresh operation based on a result of comparing the number of error bits included in the data read from the page included in the first memory block BLK1 with the first threshold number of bits. The first threshold number of bits may be the number of bits less than the number of error-correctable bits, which is the number of bits that allows an error correction operation to pass without a failure. In an embodiment, the operation controller 230 may not perform the refresh operation when the number of error bits included in the data read from the first memory block BLK1 is less than the first threshold number of bits, at a time point when the read count of the first memory block BLK1 reaches the first threshold count th_cnt1.

Thereafter, the read count of the first memory block BLK1 may reach a second threshold count th_cnt2 as the read request including the tenth logical address LA10 is repeatedly received from the host 400. The operation controller 230 may control the memory device 100 to perform the test read operation on the first memory block BLK1 when the read count of the first memory block BLK1 is equal to or greater than the second threshold count th_cnt2.

In an embodiment, when the number of error bits included in the data read from the first memory block BLK1 is greater than the first threshold number of bits, the operation controller 230 may control the memory device 100 to perform the refresh operation of copying data stored in the first super block SPBLK1 including the first memory block BLK1 to the third super block SPBLK3. The refresh operation may be ended when data is copied, to the third super block (SP-BLK3), from the first pages to the last pages of the respective first to fourth memory blocks BLK1 to BLK4 included in the first super block (SPBLK1).

In an embodiment, the host interface 210 may repeatedly receive the read request including the tenth logical address (LA10) while performing the refresh operation of copying the data stored in the first super block (SPBLK1) to the third super block SPBLK3. In an embodiment, the operation controller 230 may control the memory device 100 to read the data corresponding to the tenth logical address (LA10) included in the read request when the read request is received from the host 400 while performing the refresh operation. Specifically, with reference to FIGS. 5 and 6, the operation controller 230 may receive the read request including the tenth logical address (LA10) while copying the first data (Data1), the eleventh data (Data11), the twenty-first data (Data21), and the thirty-first data (Data31), which is stored in the first page (Page1), the eleventh page (Page11), the twenty-first page (Page21), and the thirty-first page (Page31), respectively, to the ninth to twelfth memory blocks BLK9 to BLK12 included in the third super block SPBLK3. In this case, e.g., receiving the read request including the tenth logical address (LA10) while coping the data (Data1, Data 11, Data21, Data31), the operation controller 230 may control the memory device 100 to read the data corresponding to the tenth logical address (LA10) after copying the first data (Data1), the eleventh data (Data11), the twenty-first data (Data21), and the thirty-first data (Data31) to the ninth to twelfth memory blocks (BLK9 to BLK12) Thereafter, the operation controller 230 may control the memory device 100 to copy the second data (Data2), the twelfth data (Data12), the twenty-second data (Data22), and the thirty-second data (Data32), which is stored in the second page (Page2), the twelfth page (Page12), the twenty-second page (Page22), and the thirty-second page (Page32), to the ninth to twelfth memory blocks (BLK9 to BLK12) after providing the data corresponding to the tenth logical address (LA10) read from the memory device 100 to the host 400. Thus, the read count of the first memory block (BLK1) may increase as the read request including the tenth logical address (LA10) is repeatedly received while the refresh operation is performed.

The read count of the first memory block (BLK1) may reach a third threshold count (th_cnt3) as the read request including the tenth logical address (LA10) is repeatedly received while the refresh operation is performed. The operation controller 230 may enter the host read blocking state when the read count of the first memory block (BLK1) is equal to or greater than the third threshold count (th_cnt3).

The host read blocking state may be a state in which the read operation according to the read request received from the host 400 is not performed when the read count of the memory block including the page having the physical address corresponding to the logical address included in the read request received from the host is equal to or greater than the third threshold count (th_cnt3).

In an embodiment, when the operation controller 230 enters the host read blocking state, the operation controller 230 may not read the data corresponding to the tenth logical address (LA10) from the first memory block (BLK1) even though the read request including the tenth logical address (LA10) is received from the host. When the operation controller 230 enters the host read blocking state, the operation controller 230 may not perform the read operation even though the read request is received and may not provide the data corresponding to the read request to the host 400. The read operation according to the read request received from the host 400 may be delayed until the host read blocking state is released.

When the read count of the first memory block (BLK1) is a fourth threshold count (th_cnt4), the number of error bits included in the data stored in the first memory block (BLK1) may be greater than the number of error-correctable bits. When the read count of the first memory block (BLK1) becomes equal to or greater than the fourth threshold count (th_cnt4), error correction for the data read from the first memory block (BLK1) may fail (ECC Fail). Accordingly, when the read count of the first memory block reaches the third threshold count (th_cnt3), which is less than the fourth threshold count (th_cnt4), the operation controller 230 may enter the host blocking state and may prevent the read count from increasing.

In some implementations, the host read blocking state may be released when the data corresponding to the tenth logical address (LA10) is copied from the first super block (SPBLK1) to the third super block (SPBLK3). When the host read blocking state is released, the read operation according to the read request received from the host 400 may be performed. When the host read blocking state is released, the operation controller 230 may control the memory device 100 to the read data corresponding to the tenth logical address (LA10) from the third super block (SPBLK3). Since the memory blocks included in the third super block (SP-BLK3) are free blocks, the read count of the memory blocks included in the third super block (SPBLK3) may be less than the third threshold count (th_cnt3).

In an embodiment, when the read request including the tenth logical address (LA10) is received from the host 400 after the refresh operation on the first super block (SPBLK1) is started, the operation controller 230 may copy the data corresponding to the tenth logical address (LA10) from the first super block (SPBLK1) to the third super block (SP-BLK3), release the host read blocking state, read the data corresponding to the tenth logical address (LA10) from the third super block (SPBLK3), and then provide the data corresponding to the tenth logical address (LA10) to the host 400.

However, when the refresh operation is performed sequentially according to the sequence of the physical addresses of each page as described with reference to FIG. 6, the data stored in the tenth page (Page10) having the tenth page address corresponding to the tenth logical address (LA10) may be copied from the first super block (SPBLK1) to the third super block (SPBLK3) later than data stored in other pages included in the first memory block (BLK1). As the page address corresponding to the logical address included in the read request becomes larger, such as the tenth page address, the timing at which the data corresponding to the logical address is copied to the third super block (SP-BLK3) may be delayed. Thus, the time delay for copying the data corresponding to the logical address to the third super block (SPBLK3) may be dependent on the page address corresponding to the logical address included in the read request, e.g., how many other pages exist before the page address corresponding to the logical address.

As the copying of the data corresponding to the tenth logical address LA10 from the first super block SPBLK1 to the third super block SPBLK3 gets delayed, the time for the operation controller 230 to maintain the host read blocking state increases.

As the time for the operation controller 230 to maintain the host read blocking state increases, a time required to provide the data corresponding to the tenth logical address LA10 to the host 400 may be increased. When a response including the data corresponding to the tenth logical address LA10 is not received within a predetermined time from when the host 400 provides the read request to the memory system 50, the host 400 may determine or process that the corresponding read request is failed.

In order to prevent the memory system 50 from not providing the data corresponding to the read request received from the host within a predetermined time due to the increase of the time of maintaining the host read blocking state, when the memory system 50 receives the read request including the tenth logical address LA10 from the host while performing the refresh operation, the memory system 50 may copy the data corresponding to the tenth logical address LA10 to the third super block SPBLK3 prior to copying other data stored in the first super block SPBLK1.

Figure 8:
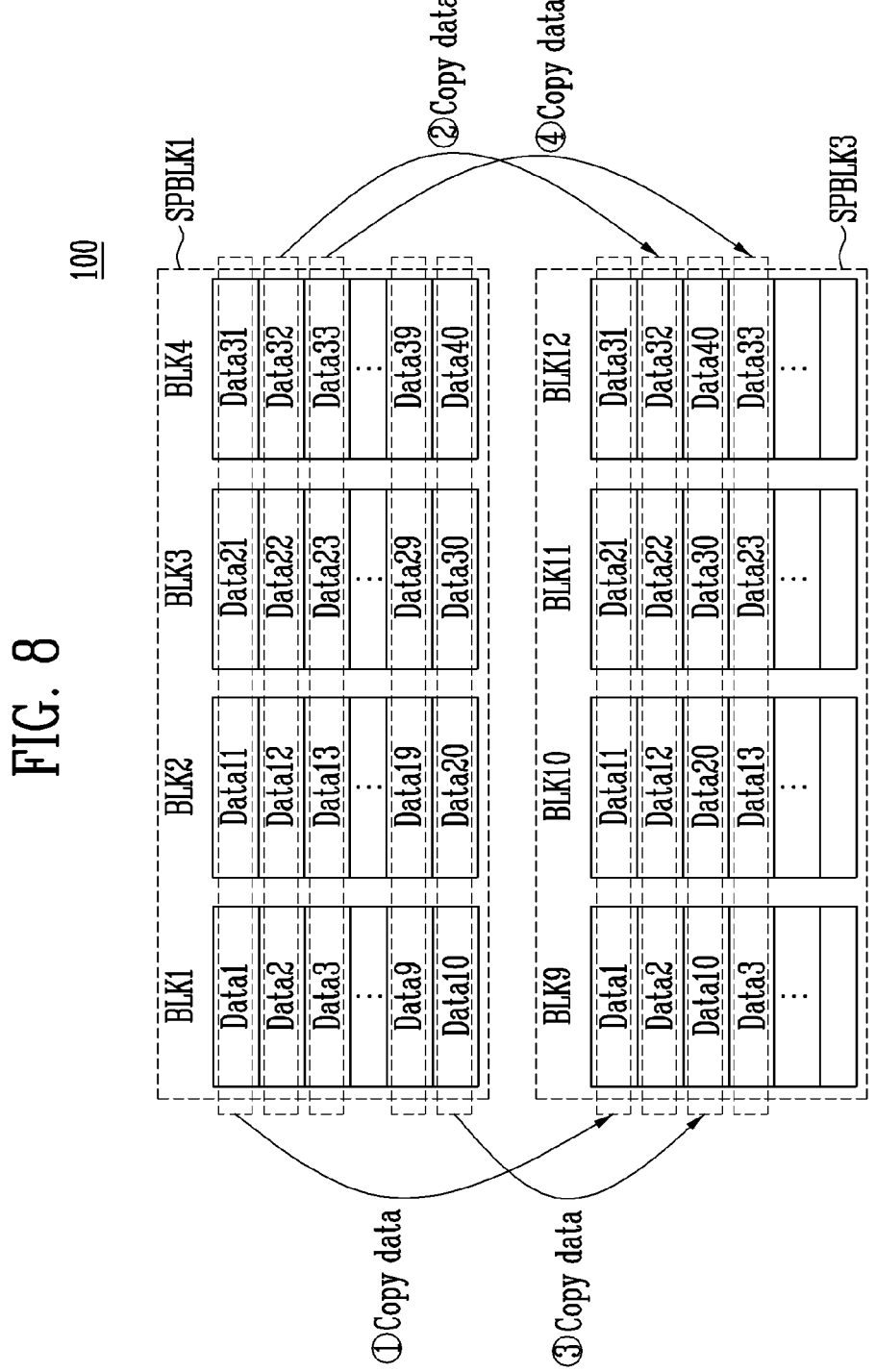
FIG. 8 is a diagram illustrating a sequence in which the refresh operation is performed in a host read blocking state based on some implementations of the disclosed technology.

FIG. 8 is a diagram illustrating a sequence in which the refresh operation is performed in the host read blocking state.

Referring to FIGS. 1, 7, and 8, when the read count of the first memory block (BLK1) is equal to or greater than the second threshold count (th_cnt2), the operation controller 230 may control the memory device 100 to perform the read operation on the first memory block (BLK1). When the number of error bits included in the data read from the first memory block (BLK1) is greater than the first threshold number of bits, the operation controller 230 may control the memory device 100 to perform the refresh operation of copying the data stored in the first super block (SPBLK1) including the first memory block BLK1 to the third super block (SPBLK3).

When the read request including the tenth logical address LA10 is repeatedly received from the host 400 while performing the refresh operation, the read count of the first memory block BLK1 in which the tenth data (Data10) corresponding to the tenth logical address (LA10) is stored may increase.

In an embodiment, the operation controller 230 may control a priority of the refresh operation on the tenth page (Page10) in which the tenth data (Data10) corresponding to the tenth logical address (LA10) is stored based on the number of times the read request including the tenth logical address (LA10) is received after the refresh operation is started.

Specifically, the read count of the first memory block (BLK1) may reach the third threshold count (th_cnt3) as the read request including the tenth logical address (LA10) is repeatedly received while performing the refresh operation. The operation controller 230 may enter the host read blocking state when the read count of the first memory block (BLK1) is equal to or greater than the third threshold count (th_cnt3). When the operation controller 230 enters the host read blocking state, the operation controller 230 may ignore the read request including the tenth logical address (LA10) received from the host 400.

In an embodiment, the operation controller 230 may copy data stored in the first to fourth memory blocks (BLK1 to BLK4) to the ninth to twelfth memory blocks (BLK9 to BLK12) according to the sequence of the page addresses. In an embodiment, the operation controller 230 may enter the host read blocking state as the read count of the first memory block (BLK1) reaches the third threshold count (th_cnt3) while copying the first data (Data1), the eleventh data (Data11), the twenty-first data (Data21), and the thirty-first data (Data31), which is stored in the first to fourth memory blocks BLK1 to BLK4, to the ninth to twelfth memory blocks (BLK9 to BLK12) (see operation, ① Copy data, as shown in FIG. 8) and copying the second data (Data2), the twelfth data (Data12), the twenty-second data (Data22), and the thirty-second data (Data32) (see operation, ② Copy data, as shown in FIG. 8) to the ninth to twelfth memory blocks BLK9 to BLK12.

In an embodiment, the operation controller 230 may change the sequence in which the refresh operation is performed when the read request including the tenth logical address (LA10) is received from the host 400 after entering the host read blocking state. Specifically, in the host read blocking state, when the read request including the tenth logical address (LA10) is received from the host 400, the operation controller 230 may control the memory device 100 to copy the tenth data (Data10) stored in the tenth page (Page10) having the tenth page address corresponding to the tenth logical address (LA10) to the third super block (SP-BLK3) prior to copying the third data (Data3) stored in the third page Page3.

As described with reference to FIG. 6, if the operation controller 230 performs the refresh operation without any change of the sequence such that the refresh operation performs in the sequence of page addresses, after the second data Data2, the twelfth data Data12, the twenty-second data Data22, and the thirty-second data Data32 are copied to the ninth to twelfth memory blocks BLK9 to BLK12, the operation controller 230 copies the third data (Data3), the thirteenth data (Data13), the twenty-third data (Data23), and the thirty-third data (Data33) to the ninth to twelfth memory blocks BLK9 to BLK12.

However, in some implementations, the operation controller 230 changes the sequence of the refresh operation. In this case, when the operation controller 230, which is in the host read blocking state, receivers the read request corresponding to the tenth logical address (LA10) from the host 400, the operation controller 230 may control the memory device 100 to copy the tenth data (Data10), the twentieth data (Data20), the thirtieth data (Data30), and the fortieth data (Data40) to the ninth to twelfth memory blocks (BLK9 to BLK12) (see operation, ③ Copy data, as shown in FIG. 8. Thus, the copying of the tenth data (Data10), the twentieth data (Data20), the thirtieth data (Data30), and the fortieth data (Data40) to the ninth to twelfth memory blocks (BLK9) is performed prior to copying the third data (Data3), the thirteenth data (Data13), the twenty-third data (Data23), and the thirty-third data (Data33).

The operation controller 230 may control the memory device 100 to read the tenth data (Data10) corresponding to the tenth logical address (LA10) received from the host 400 after copying the tenth data (Data10), the twentieth data (Data20), the thirtieth data (Data30), and the fortieth data (Data40), which is stored in the first to fourth memory blocks (BLK1 to BLK4), to the ninth to twelfth memory blocks (BLK9 to BLK12). The operation controller 230 may provide the tenth data (Data10) read from the tenth page (Page10) to the host 400.

Thereafter, the operation controller 230 may control the memory device 100 to copy the third data (Data3), the thirteenth data (Data13), the twenty-third data (Data23), and the thirty-third data (Data33), which is stored in the first to fourth memory blocks (BLK1 to BLK4), to the ninth to twelfth memory blocks (BLK9 to BLK12) (see operation, ④ Copy data, as shown in FIG. 8).

Figure 9:
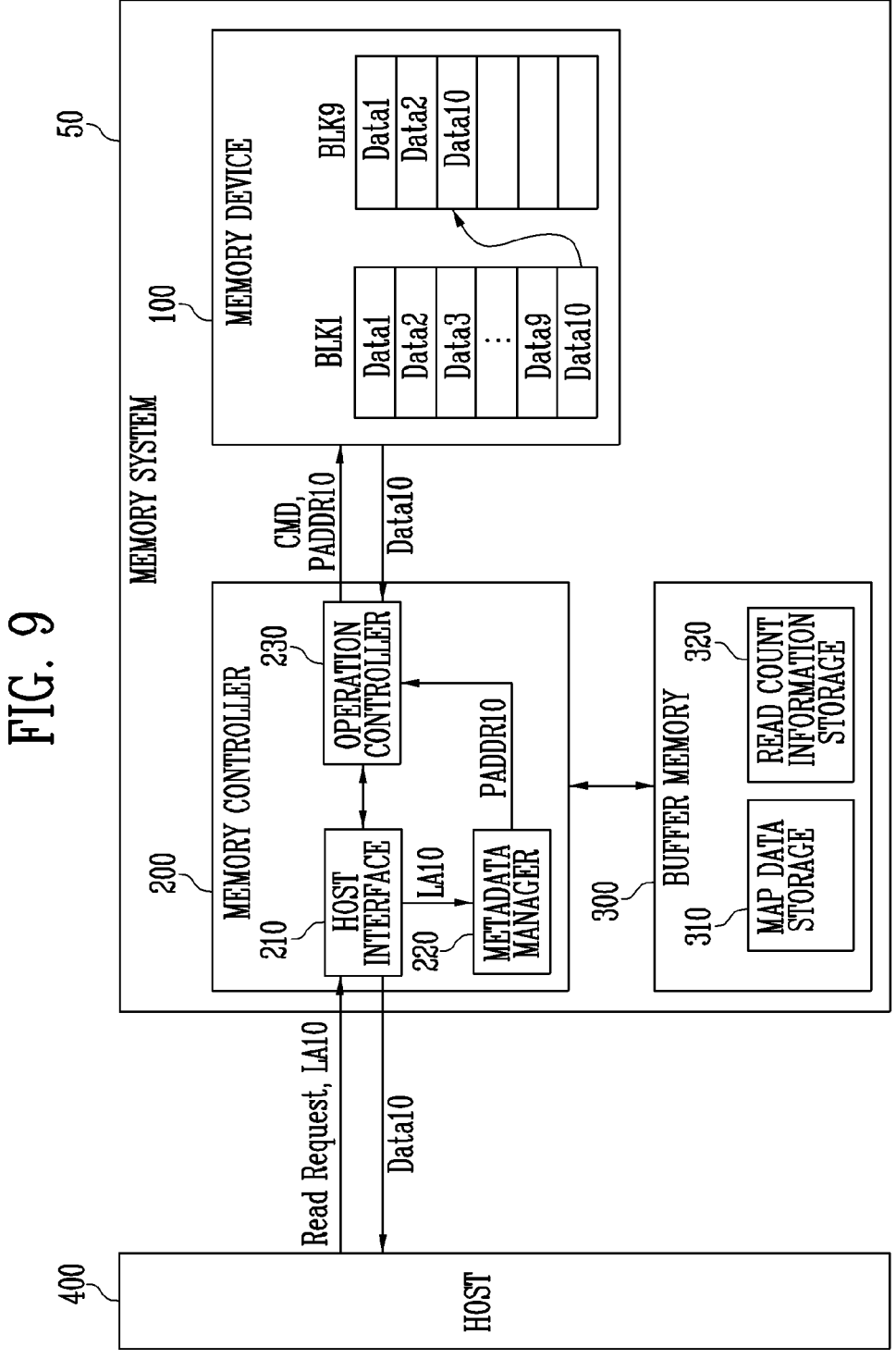
FIG. 9 is a diagram illustrating a read operation according to a read request received from a host while performing the refresh operation based on some implementations of the disclosed technology.

FIG. 9 is a diagram illustrating the read operation according to the read request received from the host while performing the refresh operation based on some implementations of the disclosed technology.

Referring to FIGS. 7, 8, and 9, the host interface 210 may receive the read request Read Request including the tenth logical address LA10 from the host 400. The metadata manager 220 may identify the tenth page address (PADDR10) corresponding to the tenth logical address (LA10) and provide the tenth page address (PADDR10) to the operation controller 230. The operation controller 230 may provide the read command (CMD) and the tenth page address (PADDR10) to the memory device 100. The memory device 100 may read the tenth data (Data10) stored in the tenth page (Page10) corresponding to the tenth page address (PADDR10) in response to the read command (CMD) and provide the tenth data (Data10) to the operation controller 230. The operation controller 230 may provide the tenth data (Data10) to the host 400 through the host interface 210.

The metadata manager 220 may read the read count information from the read count information storage 320. The metadata manager 220 may increase the read count of the first memory block (BLK1) including the tenth page (Page10) on which the read operation is performed.

The read count of the first memory block (BLK1) may reach the second threshold count (th_cnt2) as the read request including the tenth logical address (LA10) is repeatedly received. The operation controller 230 may control the memory device 100 to perform the test read operation of reading the data stored in the first memory block (BLK1) when the read count of the first memory block (BLK1) is equal to or greater than the second threshold count (th_cnt2). When the number of error bits included in the data read from the first memory block (BLK1) is greater than the first threshold number of bits, the operation controller 230 may control the memory device 100 to perform the refresh operation of copying the first to tenth data (Data1 to Data10) stored in the first memory block (BLK1) to the ninth memory block (BLK9). In an embodiment, the first memory block (BLK1) and the ninth memory block (BLK9) may be included in different super blocks. In an embodiment, memory cells included in the ninth memory block (BLK9) may store bits of the number less than those of memory cells included in the first memory block (BLK1). For example, the memory cells included in the ninth memory block (BLK9) may be single level cells (SLCs), and the memory cells included in the first memory block BLK1 may be triple level cells (TLCs).

When the read request including the tenth logical address (LA10) is received while performing the refresh operation, the operation controller (230) may stop the refresh operation, read the tenth data (Data10) corresponding to the tenth logical address (LA10), and then provide the tenth data (Data10) to the host 400.

The operation controller 230 may control the priority of the refresh operation on the tenth page in which the tenth data (Data10) corresponding to the tenth logical address (LA10) based on the number of times the tenth logical address (LA10) is received after the refresh operation of copying the first to tenth data (Data1 to Data10), which is stored in the first memory block (BLK1) to the ninth memory block (BLK9), is started.

Specifically, when the read request including the tenth logical address (LA10) is repeatedly received while performing the refresh operation, the read count of the first memory block (BLK1) may reach the third threshold count (th_cnt3) greater than the second threshold count (th_cnt2). When the read count of the first memory block (BLK1) is equal to or greater than the third threshold count (th_cnt3), the operation controller 230 may enter the host read blocking state in which the tenth data (Data10) corresponding to the tenth logical address (LA10) is not read from the first memory block (BLK1).

When the read request including the tenth logical address (LA10) is received in the host read blocking state, the operation controller 230 may control the memory device 100 to copy the tenth data (Data10) corresponding to the tenth logical address (LA10) to the ninth memory block (BLK9) prior to other data stored in the first memory block (BLK1). Specifically, when the operation controller 230 receives the read request including the tenth logical address LA10 in a state in which the first data (Data1) and the second data (Data2), which is stored in the first memory block BLK1, are copied to the ninth memory block BLK9, the operation controller 230 may control the memory device 100 to copy the tenth data (Data10) to the ninth memory block (BLK9) prior to the third to ninth data (Data3 to Data9).

The operation controller 230 may release the host read blocking state after copying the tenth data (Data10) stored in the first memory block (BLK1) to the ninth memory block (BLK9). The operation controller 230 may control the memory device 100 to read the tenth data (Data10) from the ninth memory block (BLK9). The operation controller 230 may provide the tenth data (Data10) read from the ninth memory block (BLK9) to the host 400.

Figure 10:
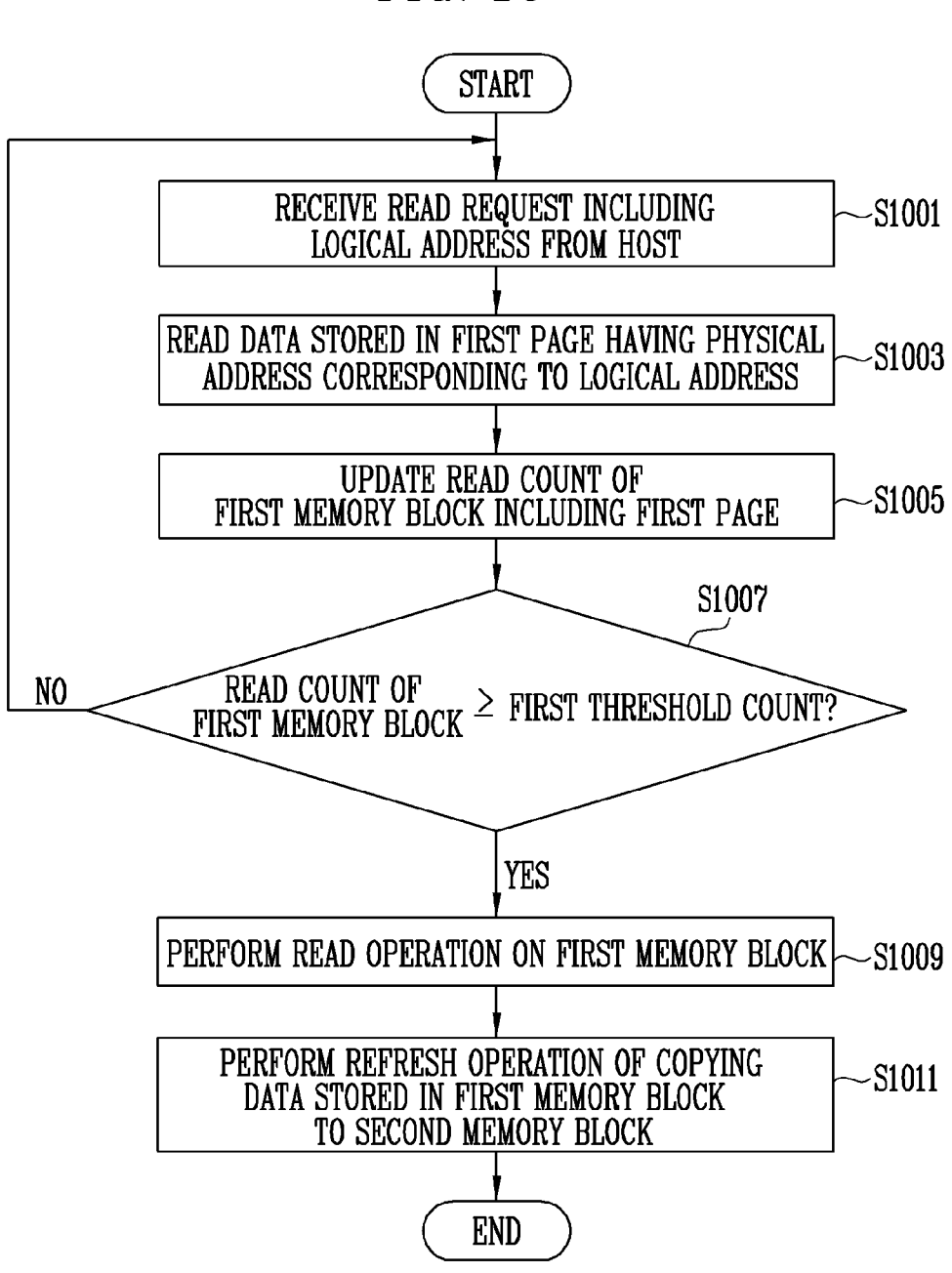
FIG. 10 is a flowchart illustrating the refresh operation performed based on the read count of the memory block based on some implementations of the disclosed technology.

FIG. 10 is a flowchart illustrating the refresh operation performed based on the read count of the memory block based on some implementations of the disclosed technology.

Referring to FIG. 10, in step S1001, the memory system 50 may receive the read request including the logical address from the host.

In step S1003, the memory system 50 may read the data stored in the first page having the physical address corresponding to the logical address. The physical address may be a page address indicating the address of the first page. The memory system 50 may provide the data read from the first page to the host.

In step S1005, the memory system 50 may update the read count of the first memory block including the first page. The read count of the first memory block may increase based on the number of times the logical address corresponding to the physical address indicating the first memory block is received from the host.

In step S1007, the memory system 50 may identify whether the read count of the first memory block is equal to or greater than the first threshold count. When the read count of the first memory block is equal to or greater than the first threshold count, step S1009 may be performed. When the read count of the first memory block is less than the first threshold count, step S1001 may be performed.

In step S1009, the memory system 50 may perform the test read operation on the first memory block when the read count of the first memory block is equal to or greater than the first threshold count. The test read operation may include an operation of reading the data stored in at least one page included in the first memory block and counting the number of error bits included in the read data.

In step S1011, the memory system 50 may perform the refresh operation of copying the data stored in the first memory block to the second memory block. The refresh operation may be performed when the read count of the first memory block is equal to or greater than the first threshold count, and the number of error bits included in the data read from the first memory block is greater than the first threshold number.

Figure 11:
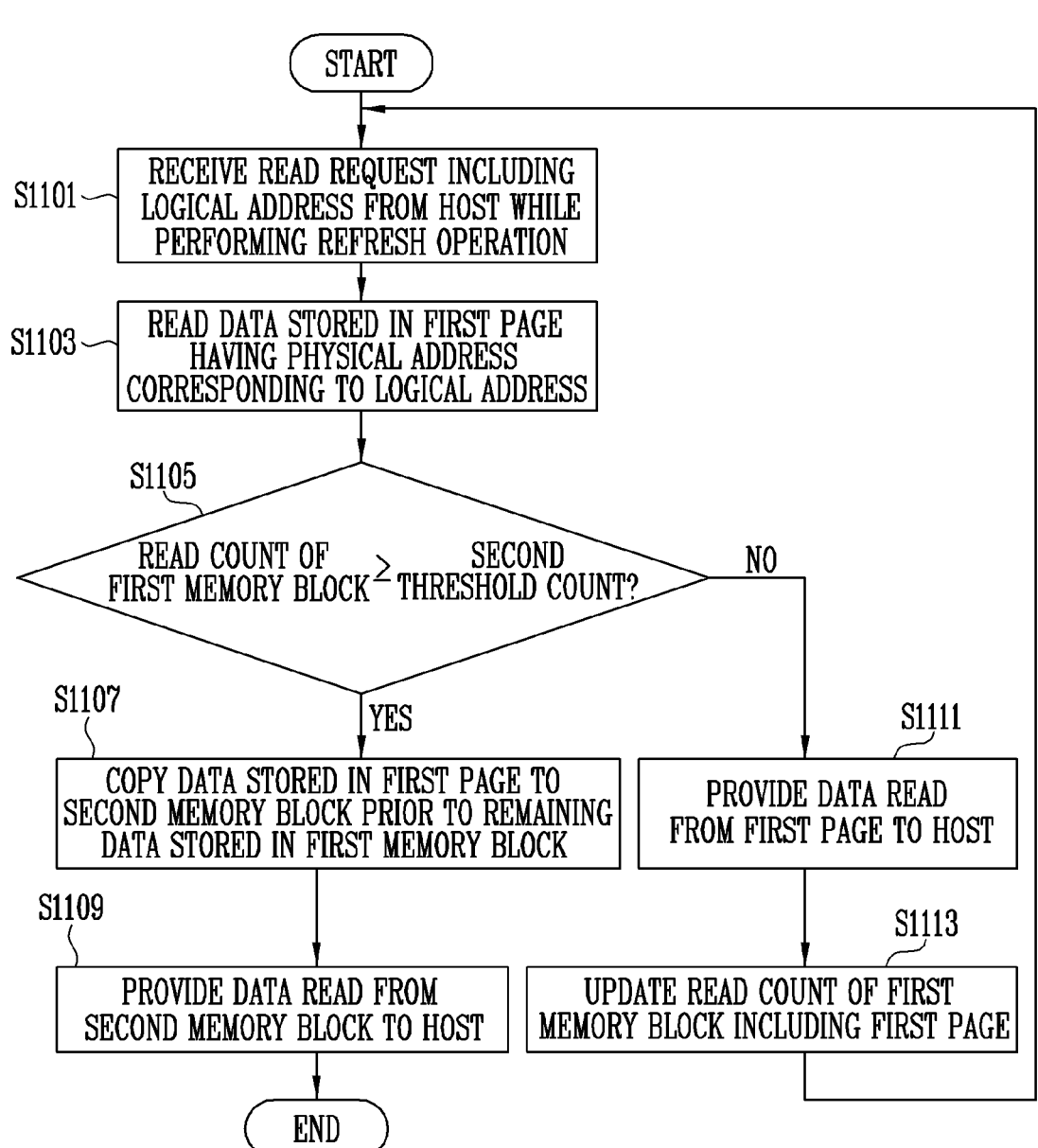
FIG. 11 is a flowchart illustrating an operation of copying data corresponding to the read request prior to other data based on the read count of the memory block based on some implementations of the disclosed technology.

FIG. 11 is a flowchart illustrating an operation of copying the data corresponding to the read request prior to other data based on the read count of the memory block.

In an embodiment, a step shown in FIG. 11 may be performed after step S1011 of FIG. 10. Referring to FIG. 11, in step S1101, the memory system 50 may receive the read request including the logical address from the host while performing the refresh operation of copying the data stored in the first memory block to the second memory block.

In step S1103, the memory system 50 may identify the read count of the first memory block including the first page having the physical address corresponding to the logical address. The read count of the first memory block may increase according to the number of times the logical address corresponding to the physical address indicating the first memory block is received from the host.

In step S1105, the memory system 50 may identify whether the read count of the first memory block is equal to or greater than the second threshold count. When the read count of the first memory block is equal to or greater than the second threshold count, step S1107 may be performed. When the read count of the first memory block is less than the second threshold count, step S1111 may be performed.

In step S1107, when the read count of the first memory block is equal to or greater than the second threshold count, the memory system 50 may copy the data stored in the first page to the second memory block prior to remaining data stored in the first memory block.

In step S1109, the memory system 50 may provide the data read from the second memory block to the host.

In step S1111, when the read count of the first memory block is less than the second threshold count, the memory system 50 may provide the data read from the first page to the host.

In step S1113, the memory system 50 may update the read count of the first memory block including the first page.

Figure 12:
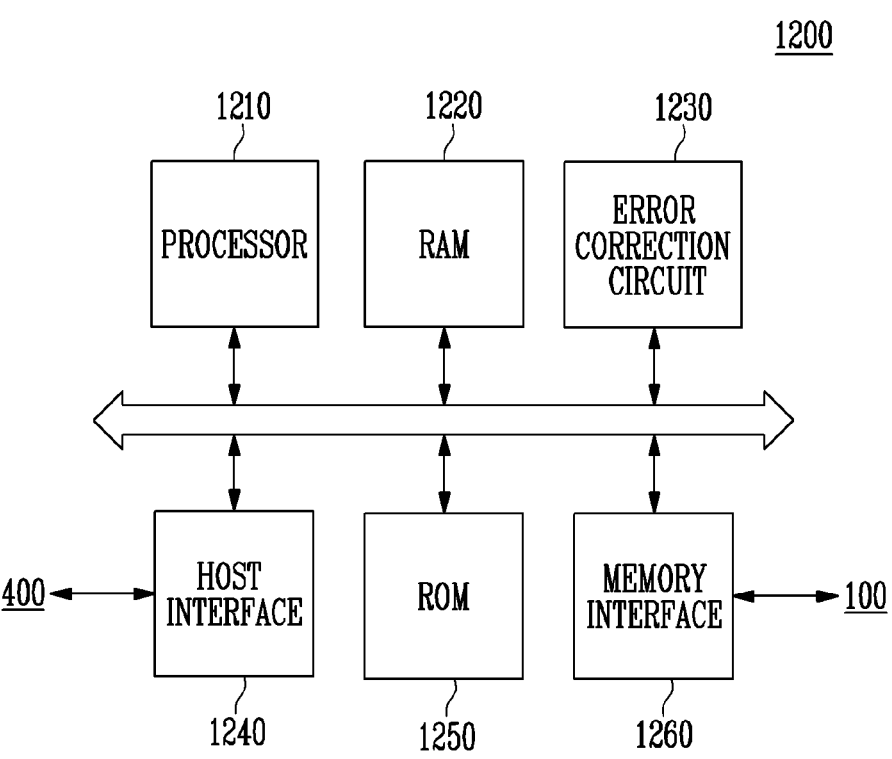
FIG. 12 is a diagram illustrating a memory controller based on some implementations of the disclosed technology.

FIG. 12 is a diagram illustrating the memory controller.

Referring to FIG. 12, the memory controller 1200 may include a processor 1210, a RAM 1220, an error correction circuit 1230, a host interface 1240, a ROM 1250, and a memory interface 1260.

The processor 1210 may control an overall operation of the memory controller 1200. The processor 1210 may control an operation of the memory controller 1200 to store data requested from the host 400 in the memory device 100. In an embodiment, the processor 1210 may control the memory device to perform the refresh operation of copying the data stored in any one of the plurality of memory blocks to another memory block based on the read count of the plurality of memory blocks. The refresh operation may be garbage collection or read reclaim. The processor 1210 may increase the read count of the memory block based on the number of times the read request including the logical address is received from the host 400.

The RAM 1220 may be used as a buffer memory, a cache memory, an operation memory, or the like of the memory controller 1200. In an embodiment, the RAM 1220 may store the map data indicating the correspondence relationship between the logical address of the host 400 and the physical address of the memory device 100. The RAM 1220 may store the read count information indicating the number of times the read operation on each of the plurality of memory blocks is performed.

The error correction circuit 1230 may perform error correction. The error correction circuit 1230 may perform error correction encoding (ECC encoding) based on data to be written to the memory device 100 through the memory interface 1260. The error correction encoded data may be transferred to the memory device 100 through the memory interface 1260. The error correction circuit 1230 may perform error correction decoding (ECC decoding) on data received from the memory device 100 through the memory interface 1260.

The ROM 1250 may store various pieces of information required for the memory controller 1200 to operate in a form of firmware.

The memory controller 1200 may communicate with an external device (for example, the host 400, an application processor, or the like) through the host interface 1240. The memory controller 1200 may receive data through the host interface 1240. In an embodiment, the host interface 1240 may receive the read request including the logical address from the host 400.

The memory controller 1200 may communicate with the memory device 100 through the memory interface 1260. The memory controller 1200 may transmit a command, an address, and data to the memory device 100 through the memory interface 1260. The memory interface 1260 may provide a command for performing a refresh operation to the memory device 100.

Figure 13:
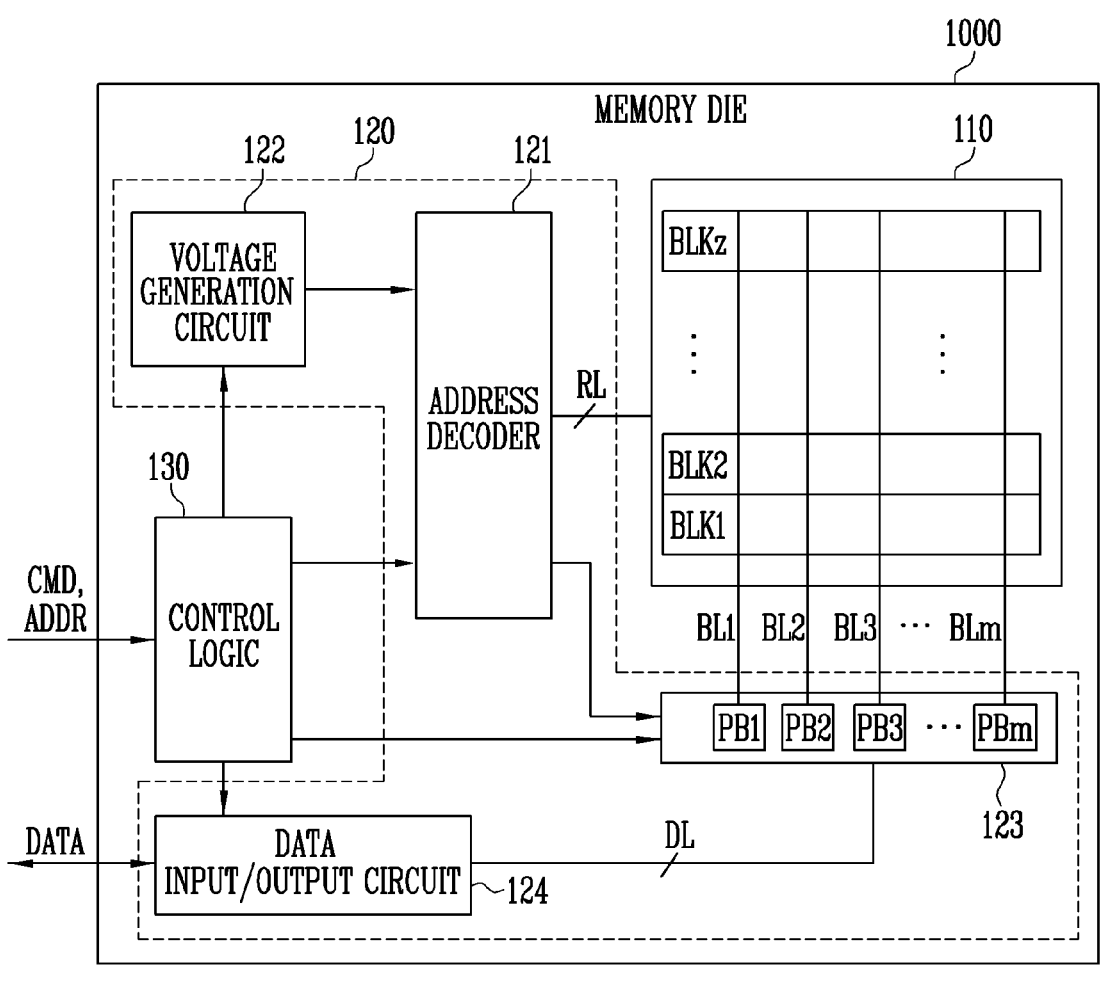
FIG. 13 is a diagram illustrating a memory die based on some implementations of the disclosed technology.

FIG. 13 is a diagram illustrating a memory die.

Referring to FIG. 13, the memory die 1000 may be any one of the first to eighth memory dies 101 to 108 shown in FIG. 2. The memory die 1000 may include a memory cell array 110, a peripheral circuit 120, and a control logic 130.

The memory cell array 110 may include a plurality of memory blocks BLK1 to BLKz. The plurality of memory blocks BLK1 to BLKz may be connected to an address decoder 121 through row lines RL. The plurality of memory blocks BLK1 to BLKz may be connected to a page buffer group 123 through bit lines BL1 to BLm. Each of the plurality of memory blocks BLK1 to BLKz may include a plurality of memory cells. In an embodiment, the plurality of memory cells may be nonvolatile memory cells.

The peripheral circuit 120 may drive the memory cell array 110. For example, the peripheral circuit 120 may drive the memory cell array 110 to perform the program operation, the read operation, and the erase operation under control of the control logic 130. As another example, the peripheral circuit 120 may apply various operation voltages to the row lines RL and the bit lines BL1 to BLm or discharge the applied voltages according to the control of the control logic 130.

The peripheral circuit 120 may include the address decoder 121, a voltage generation circuit 122, the page buffer group 123, and a data input/output circuit 124.

The address decoder 121 may be connected to the memory cell array 110 through row lines RL. The row lines RL may include drain select lines, dummy word lines, a plurality of word lines, and source select lines.

The address decoder 121 may be configured to operate in response to the control of the control logic 130. The address decoder 121 may receive an address from the control logic 130.

The address decoder 121 may be configured to decode a row address of the received address. The address decoder 121 may select at least one word line of a selected memory block by applying voltages provided from the voltage generation circuit 122 to at least one word line according to the row address.

The address decoder 121 may be configured to decode a column address of the address. The column address may be transferred to the page buffer group 123. In an embodiment, the address decoder 121 may include the address decoder 160 of FIG. 2.

During the program operation, the address decoder 121 may apply the program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

The voltage generation circuit 122 may generate a plurality of operation voltages using an external power voltage supplied to the memory die 1000. The voltage generation circuit 122 may operate in response to control of the control logic 130. In an embodiment, the voltage generation circuit 122 may include the voltage generation circuit 150 of FIG. 2.

In an embodiment, the voltage generation circuit 122 may generate various operation voltages used for the program, read, and erase operations. For example, the voltage generation circuit 122 may generate a plurality of erase voltages, a plurality of program voltages, a plurality of pass voltages, a plurality of select read voltages, and a plurality of unselect read voltages. The operation voltages may be supplied to the memory cell array 110 by the address decoder 121.

The page buffer group 123 may include first to m-th page buffers PB1 to PBm. The first to m-th page buffers PB1 to PBm may be connected to the memory cell array 110 through first to m-th bit lines BL1 to BLm, respectively. The first to m-th page buffers PB1 to PBm may operate in response to the control of the control logic 130.

The first to m-th page buffers PB1 to PBm may communicate data with the data input/output circuit 124. At a time of program, the first to m-th page buffers PB1 to PBm may receive the data through the data input/output circuit 124 and data lines DL.

During the program operation, the first to m-th page buffers PB1 to PBm may transmit the data received through the data input/output circuit 124 to the selected memory cells through the bit lines BL1 to BLm. The memory cells of the selected page may be programmed according to the transmitted data. A memory cell connected to a bit line to which a program allowable voltage (for example, a ground voltage) is applied may have an increased threshold voltage. A threshold voltage of a memory cell connected to a bit line to which a program inhibit voltage (for example, a power voltage) is applied may be maintained. During the program verify operation, the first to m-th page buffers PB1 to PBm may read the data stored in the memory cells from selected memory cells through the bit lines BL1 to BLm.

During the read operation, the page buffer group 123 may sense the data from the memory cells of the selected word line through the bit lines BL1 to BLm, and store the sensed data to the first to m-th page buffers PB1 to PBm.

The data input/output circuit 124 may be connected to the first to m-th page buffers PB1 to PBm through the data lines DL. The data input/output circuit 124 may operate in response to the control of the control logic 130. During the program operation, the data input/output circuit 124 may receive data to be stored from the memory controller 200. During the read operation, the data input/output circuit 124 may output the data sensed in the first to m-th page buffers PB1 to PBm to the memory controller 200.

The control logic 130 may be connected to the address decoder 121, the voltage generation circuit 122, the page buffer group 123, and the data input/output circuit 124. The control logic 130 may be configured to control all operations of the memory device 100. The control logic 130 may operate in response to a command CMD transferred from the memory controller 200. The control logic 130 may control the peripheral circuit 120 by generating various signals in response to the command CMD and an address ADDR.

In addition to the above described specific examples of embodiments of the disclosed technology, variations of the above described embodiments and other embodiments may be made based on what is disclosed and/or illustrated in this patent document.

What is claimed is:

1. A memory system comprising:
a memory device including a first memory block and a second memory block; and
a memory controller in communication with the memory device and configured, in response to a read request from a host, to control the memory device to read data stored in a first page corresponding to a first logical address included in the read request, update a read count of the first memory block including the first page, and perform a refresh operation of copying data stored in pages of the first memory block to the second memory block based on the read count of the first memory block,
wherein the memory controller is further configured to control the memory device to perform a test read operation of reading data stored in the first memory block in response to the read count of the first memory block being greater than a first threshold count, and
wherein the memory controller is further configured to control the memory device to perform the refresh operation on the first page corresponding to the first logical address among the pages of the first memory block prior to performing the refresh operation on other pages of the first memory block in response to the read request being received after the read count of the first memory block becomes greater than a second threshold count greater than the first threshold count.

2. The memory system of claim 1, wherein the memory controller is further configured to determine whether to perform the refresh operation based on a result of comparing the number of error bits included in data read from the first memory block with a first threshold number of bits less than the number of error correctable bits that are capable of being corrected through an error correction operation.

3. The memory system of claim 2, wherein the memory controller is further configured to control the memory device to perform the refresh operation in response to the number of error bits being greater than the first threshold number of bits.

4. The memory system of claim 1, wherein the memory controller is further configured to copy data stored in the first page to a second page of the second memory block and provide data read from the second page to the host.

5. The memory system of claim 4, wherein the memory controller is further configured to control the memory device to perform the refresh operation on other pages of the first memory block after providing the data read from the second page to the host.

6. The memory system of claim 4, wherein the memory controller is further configured to control the memory device such that memory cells included in the second memory block store a first number of bits less than a second number of bits that is stored in memory cells included in the first memory block.

7. The memory system of claim 1, wherein the memory controller is further configured to control the memory device during the refresh operation to sequentially copy data stored in the first memory block to the second memory block based on a sequence of physical addresses of the pages of the first memory block.

8. The memory system of claim 7, wherein a physical address corresponding to the first page has a largest physical address among the physical addresses of the pages of the first memory block.

9. A memory controller for controlling operations of a memory device, the memory controller comprising:
a host interface configured to receive a read request including a logical address from a host;
a metadata manager configured to update a read count of a first memory block including a first page corresponding to the logical address; and
an operation controller in communication with the memory device including a first memory block of pages of memory cells and a second memory block of pages of memory cells and configured to control the memory device to perform a refresh operation of copying data stored in pages of the first memory block to the second memory block based on a read count of the first memory block,
wherein the operation controller is further configured to perform a test read operation of counting the number of error bits included in data read from the first memory block in response to the read count of the first memory block being greater than a first threshold count, and
wherein the operation controller is further configured to enter a host read blocking state delaying performance of a read operation corresponding to the read request until data stored in the first page is copied to the second memory block in response to the read count of the first memory block being greater than a second threshold count greater than the first threshold count.

10. The memory controller of claim 9, wherein the operation controller is further configured to control the memory device to perform the refresh operation in response to the number of error bits being greater than the first threshold number of bits less than the number of error correctable bits that are capable of being corrected through an error correction operation.

11. The memory controller of claim 9, wherein the operation controller is further configured to control the memory device to perform the refresh operation on the first page corresponding to the logical address among the pages of the first memory block prior to performing the refresh operation on other pages of the first memory block in response to the read count of the first memory block being greater than a second threshold count.

12. The memory controller of claim 9, wherein the operation controller is further configured to copy data stored in the first page to a second page of the second memory block, release the host read blocking state, and provide data read from the second page to the host.

13. A memory system comprising:
a memory device including a first memory block and a second memory block; and
a memory controller in communication with a host and the memory device and configured, in response to a read request from the host, to control the memory device to read data stored in a first page corresponding to a logical address included in the read request, update a read count of the first memory block including the first page, and perform a refresh operation of copying data stored in pages of the first memory block to the second memory block based on the read count of the first memory block, wherein the memory controller is further configured to enter a host read blocking state delaying performance of a read operation corresponding to the read request based on the read count of the first memory block, the read count increasing after the refresh operation is started.

14. The memory system of claim 13, wherein the memory controller is further configured to, during the refresh operation, enter the host read blocking state in response to the read count of the first memory block being greater than a threshold count based on the read request.

15. The memory system of claim 14, wherein the memory controller is further configured, in response to the read count of the first memory block being greater than the threshold count, to control the memory device to copy data stored in the first page corresponding to the logical address to a second page of the second memory block prior to copying other data stored in the first memory block to the second page.

16. The memory system of claim 15, wherein the memory controller is further configured to provide data read from the second page to the host in response to the read request.

* * * * *